Sept. 23, 1947.  L. TROMBETTA  2,427,696
WELDING MACHINE
Filed July 13, 1945  2 Sheets-Sheet 1

INVENTOR.
Louis Trombetta
BY
Ralph L Chappell
ATTORNEY.

Sept. 23, 1947.　　　　L. TROMBETTA　　　2,427,696
WELDING MACHINE
Filed July 13, 1945　　　　2 Sheets-Sheet 2
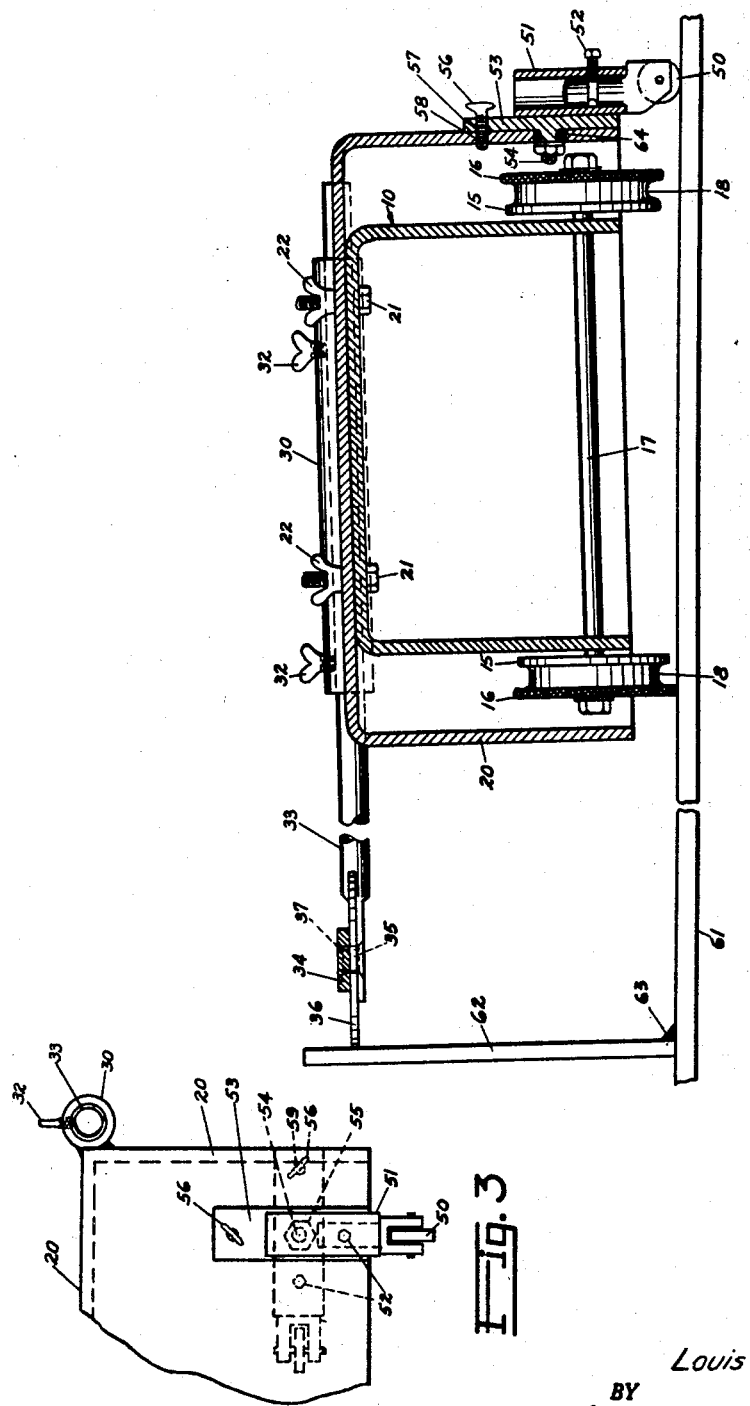
INVENTOR.
Louis Trombetta
BY
Ralph L. Chappell
ATTORNEY.

Patented Sept. 23, 1947

2,427,696

UNITED STATES PATENT OFFICE 2,427,696

WELDING MACHINE

Louis Trombetta, New York, N. Y.

Application July 13, 1945, Serial No. 604,943

2 Claims. (Cl. 113—59)

(Granted under the act of March 3, 1883, as amended April 30, 1928; 370 O. G. 757)

This invention relates to a carrier for a welding machine.

In the past when long stiffeners were to be welded to a deck or plate the welding apparatus was propelled on tracks. This invention eliminates the tracks and the attendant labor required to lay and remove the tracks and provides a means of welding in areas where it is not feasible to use tracks.

An object of this invention is to provide a carriage for welding apparatus which will eliminate the use of tracks.

Another object of this invention is to provide a carriage for a welding machine which can readily be used with or without tracks.

Still another object of this invention is to provide a carriage for a welding apparatus which can be spaced as desired from the work.

Further objects and advantages of this invention, as well as its construction, arrangement and operation, will be apparent from the following description and claims in connection with the accompanying drawings, in which, Fig. 1 is a top plan view of the carriage, a portion being broken away for clarity.

Fig. 2 is a view in vertical section on the line 2—2 of Fig. 1 and showing the device in use.

Fig. 3 is a fragmentary view of the casing showing the casters in operative position, the inoperative position of the casters being shown by phantom lines.

Figure 1:
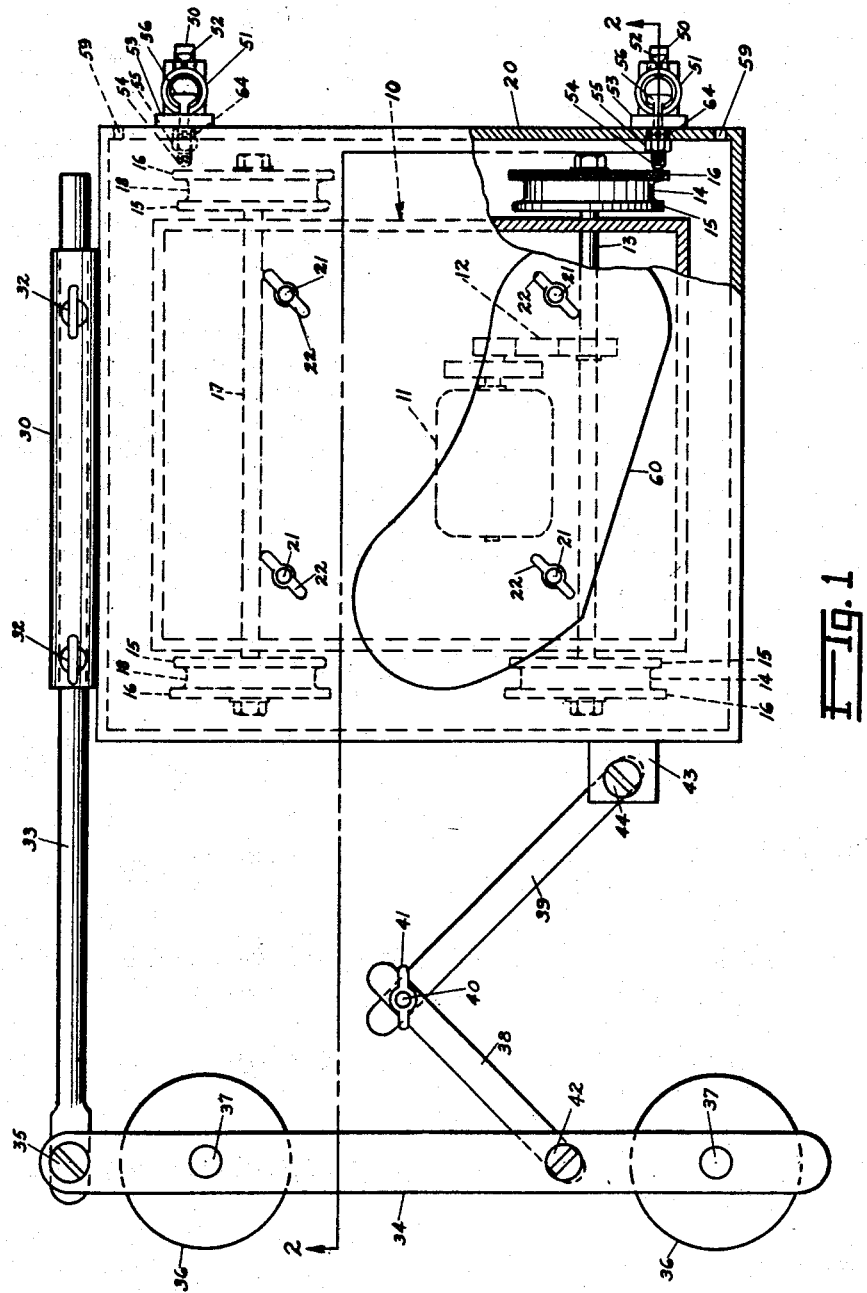

Referring to the drawings in detail, Figs. 1 and 2 show a preferred embodiment of the invention in which a welding machine carriage is indicated generally at 10 and has a drive motor 11 and reduction gears 12 to rotate the shaft 13 and drive wheels 14.

Drive wheels 14 have flanges 15 for normal track operation and a knurled flange 16 for better traction during trackless operation as will subsequently be more fully disclosed herein. Shaft 17 in the forward portion of carriage 10 mounts wheels 18 of a construction similar to drive wheels 14.

To adapt carriage 10 for trackless operation, casing 20 is mounted on carriage 10 by means of bolts 21 and wing nuts 22.

Welded or otherwise suitably secured to the casing 20 is sleeve 30 which slidably mounts adjusting bar 33 which in turn is pivotally connected to guide arm 34 by means of pivot 35, adjusting bar 33 being held in sleeve 30 by means of set screws 32. Rollers 36 which guide the machine along the work are rotatably mounted on guide arm 34 by means of pivots 37.

Proper positioning of guide arm 34 is accomplished by means of links 38 and 39 pivoted together by bolt 40 and wing nut 41. Link 38 is also pivoted to guide arm 34 by means of pivot 42 while link 39 is pivoted to bracket 43 by means of pivot 44, bracket 43 being welded to casing 20.

On the right side of the casing 20, as viewed in Fig. 1, are two casters 50 slidably and rotatably mounted in sleeves 51 and prevented from falling out by set screws 52, which are freely slidable in complementary grooves in the casters 50, sleeves 51 are welded to arms 53, the arms 53 being attached to casing 20 by means of threaded studs 54 integral with the arms 53 and nuts 55, the studs 54 being mounted in bushings 64. The arms 53 are held vertically in the operative position by means of set screws 56 which are received by the threaded bores 57 in the arms 53 and the threaded bores 58 in casing 20. The arms 53 are held in a horizontal inoperative position by threading set screws 56 in threaded bores 59 disposed in the same horizontal plane as the studs 54.

A support 60 for the welding head to be used is attached to the top of casing 20 by means of the wing nuts 22, or other suitable means.

In operation the device is placed on the deck 61, and the casters 50 placed in operative position, raising one pair of wheels 14 and 18 off the deck. The guide arm 34 is set at an angle slightly greater than 90° with respect to adjusting bar 33 to cause the device to move toward the work. Rollers 36 are placed against stiffener 62 which is to be welded to deck 61 and the device set in motion, the weld being made at 63, the intersection of deck 61 and stiffener 62. By using casters 50 instead of wheels 14 and 18 for locomotion the device can be readily turned around curves and corners. When it is desired to move the device on all four wheels 14 and 18, either on tracks or a surface, the casters 50 are moved to the inoperative horizontal position.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A welding machine comprising a carriage, a casing on said carriage, an elongated member, means to adjustably position said elongated member with respect to said casing, a guide arm pivoted to said elongated member, rollers on said guide arm, and means to vary the angular relationship of said guide arm with respect to said elongated member, said means comprising links pivotally mounted on said casing and said guide arm, and means to fix the angular relationship of said links with respect to each other.

2. A welding machine comprising a carriage, a casing on said carriage, a sleeve on the end of said casing, a bar slidably mounted in said sleeve, set screws in said sleeve to fix the position of said bar, said bar extending beyond one side of said casing, a guide arm pivoted to the free end of said bar, rollers rotatably mounted on vertical axes on said guide arm, a bracket on the said one side of said casing, a link pivoted to said bracket, a second link pivoted to said guide arm, said links being connected at a point between said guide arm and said one side of said casing, means to fix the angular relationship of said links with respect to each other, arms on the other side of said casing, said arms being pivoted to said casing at a point between their extremities, threaded apertures in said casing above said last named pivots, threaded apertures in said casing in the same plane as said last named pivots, set screws at one end of said arms for reception selectively by said apertures, sleeves fixed to said arms, casters mounted in said sleeves, wheels on said carriage, said wheels having inner flanges, said wheels having outer flanges, said outer flanges being of greater diameter than said inner flanges, said outer flanges being roughened, the last named sleeves being of such length as to raise the wheels on said other side of said casing, and a welding head support mounted on said casing.

LOUIS TROMBETTA.

REFERENCES CITED

The following references are of record in the file of this patent:

UNITED STATES PATENTS

| Number | Name | Date |
| --- | --- | --- |
| 2,015,329 | Anderson | Sept. 24, 1935 |
| 1,811,835 | Anderson | June 30, 1931 |
| 2,055,527 | Glaum | Sept. 29, 1936 |